United States Patent
Oyama et al.

(10) Patent No.: US 9,143,260 B2
(45) Date of Patent: Sep. 22, 2015

(54) OPTICAL TRANSMISSION SYSTEM, METHOD OF ADJUSTING OPTICAL TRANSMISSION DEVICE, AND NON-TRANSITORY COMPUTER-READABLE MEDIUM

(71) Applicant: FUJITSU LIMITED, Kawasaki-shi, Kanagawa (JP)

(72) Inventors: Tomofumi Oyama, Kawasaki (JP); Takeshi Hoshida, Kawasaki (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/048,858

(22) Filed: Oct. 8, 2013

(65) Prior Publication Data
US 2014/0099110 A1    Apr. 10, 2014

(30) Foreign Application Priority Data
Oct. 10, 2012  (JP) ................. 2012-225141

(51) Int. Cl.
*H04B 10/50* (2013.01)
*H04B 10/572* (2013.01)
*H04J 14/02* (2006.01)
*H04J 14/06* (2006.01)

(52) U.S. Cl.
CPC .............. *H04J 14/02* (2013.01); *H04B 10/506* (2013.01); *H04B 10/572* (2013.01); *H04J 14/0256* (2013.01); *H04J 14/0276* (2013.01); *H04J 14/06* (2013.01)

(58) Field of Classification Search
CPC .... H04B 10/07; H04B 10/075; H04B 10/077; H04B 10/773; H04B 10/775; H04B 10/779; H04B 10/50; H04B 10/506; H04B 10/572; H04B 17/00; H04B 17/003; H04J 14/02; H04J 14/06
See application file for complete search history.

(56) References Cited

U.S. PATENT DOCUMENTS

| | | | |
|---|---|---|---|
| 5,953,139 A * | 9/1999 | Nemecek et al. | 398/79 |
| 2003/0030876 A1 | 2/2003 | Takei | |
| 2004/0188600 A1* | 9/2004 | Chapman | 250/227.23 |
| 2012/0141130 A1 | 6/2012 | Nakashima | |

FOREIGN PATENT DOCUMENTS

| | | |
|---|---|---|
| JP | 63-45877 | 2/1988 |
| JP | 5-72046 | 3/1993 |
| JP | 2003-60578 | 2/2003 |
| JP | 2012-120010 | 6/2012 |

* cited by examiner

*Primary Examiner* — Darren E Wolf
(74) *Attorney, Agent, or Firm* — Staas & Halsey LLP

(57) ABSTRACT

An optical transmission system includes: a plurality of transmitters that output an optical signal having a frequency different from each other; a process unit that adds a reference signal to at least two of the optical signals, the reference signal having a frequency width narrower than that of the two optical signals, an interval of central frequencies of the reference signals being narrower than that of the two optical signals, a multiplexer that multiplexes optical signals output by the plurality of transmitters; an extract unit that extracts a beat signal generated between the reference signals because of a multiplexing of the multiplexer; and an adjust unit that adjusts a frequency interval of the two optical signals in accordance with an extract result of the extract unit.

10 Claims, 15 Drawing Sheets

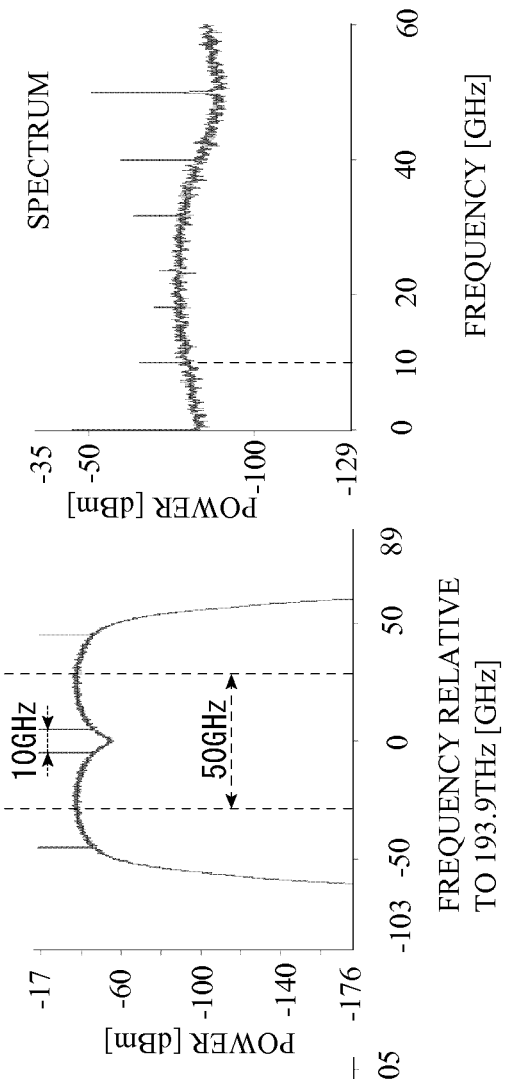

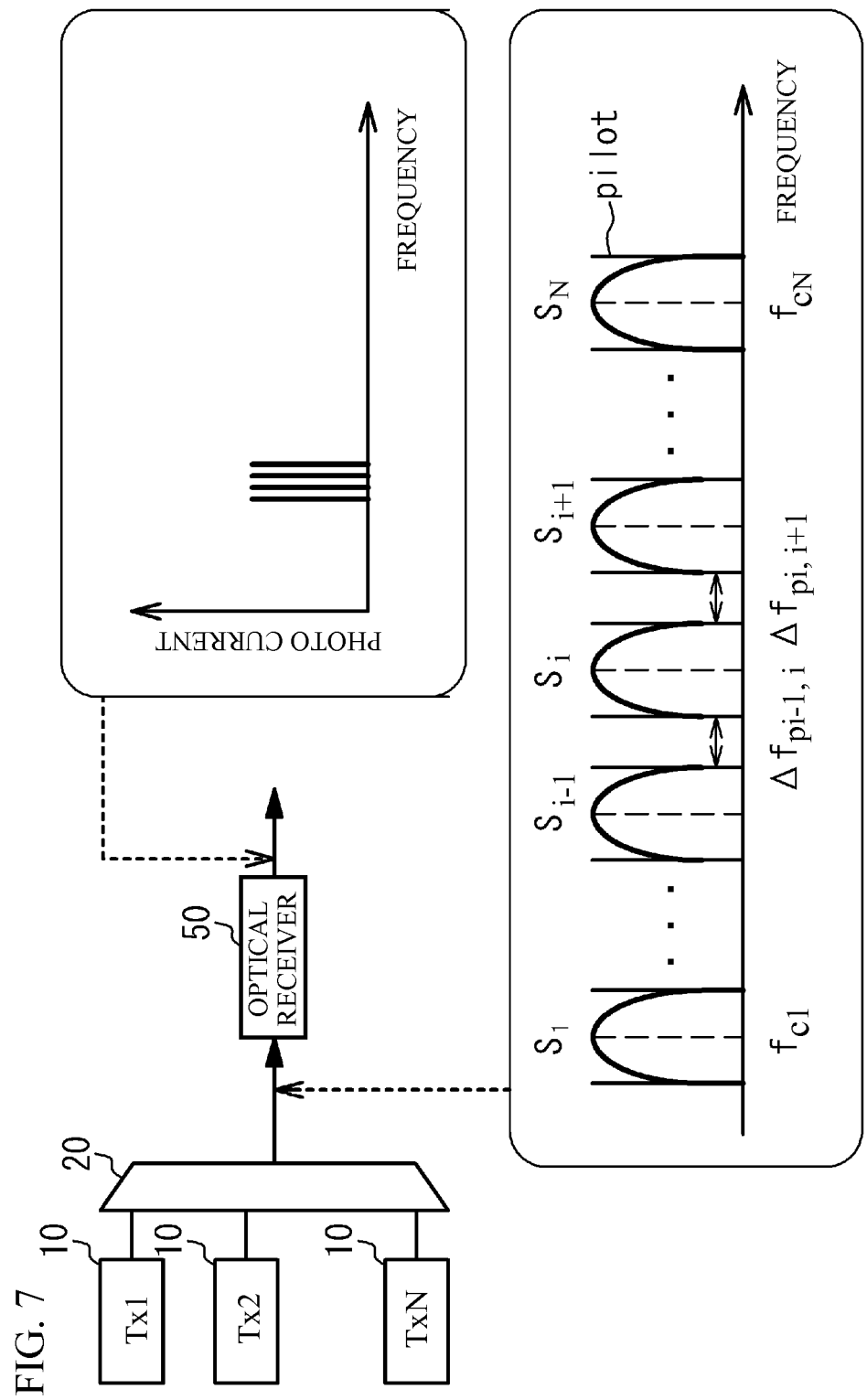

FREQUENCY RELATIVE
TO 193.9THz [GHz]

FREQUENCY [GHz]

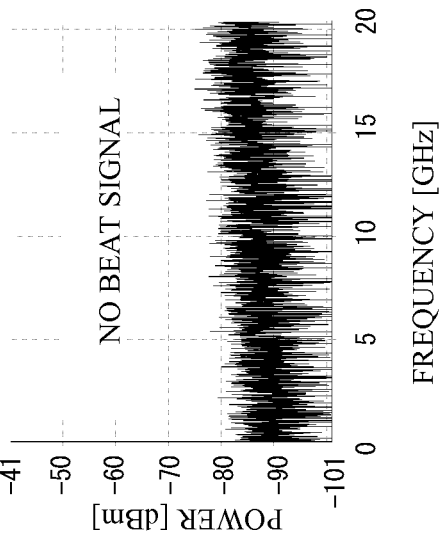
FIG. 13A
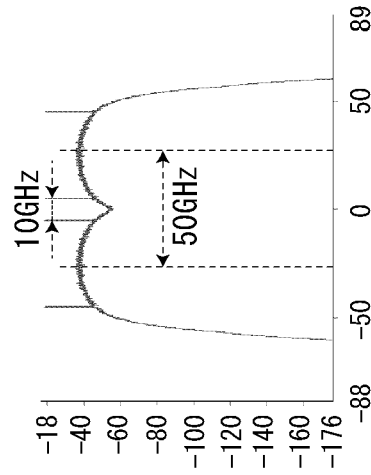
FIG. 13B
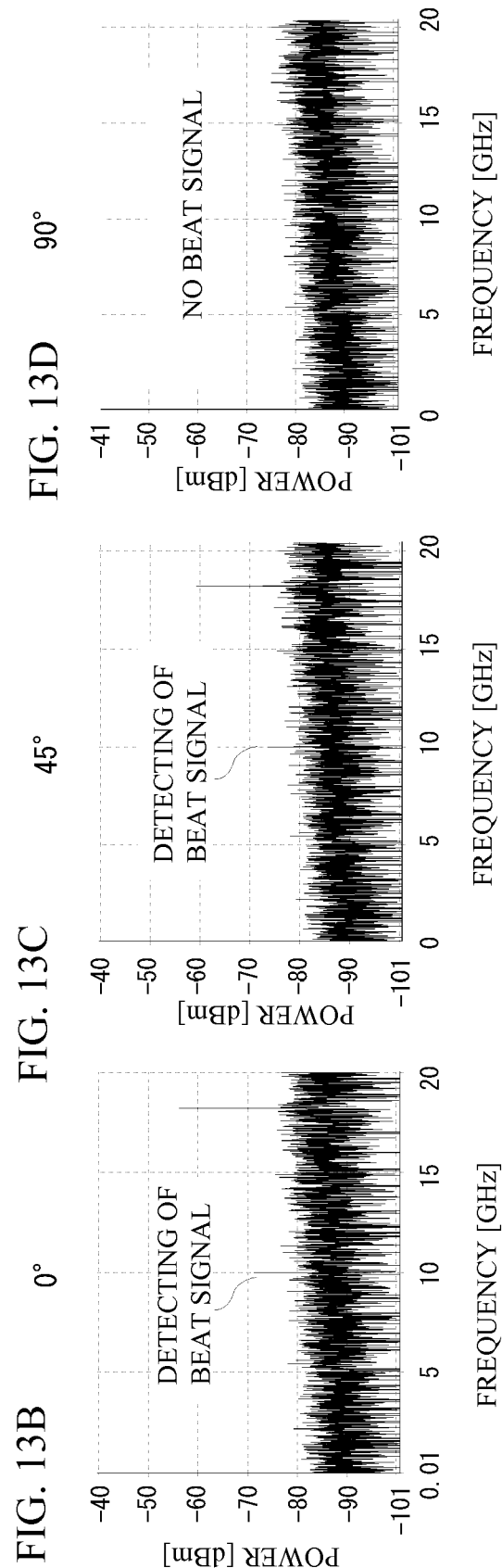
FIG. 13C
FIG. 13D

OPTICAL TRANSMISSION SYSTEM, METHOD OF ADJUSTING OPTICAL TRANSMISSION DEVICE, AND NON-TRANSITORY COMPUTER-READABLE MEDIUM

CROSS-REFERENCE TO RELATED APPLICATION

This application is based upon and claims the benefit of priority of the prior Japanese Patent Application No. 2012-225141, filed on Oct. 10, 2012, the entire contents of which are incorporated herein by reference.

FIELD

A certain aspect of embodiments described herein relates to an optical transmission system, a method of adjusting an optical transmission device, and a program of adjusting an optical transmission device.

BACKGROUND

Japanese Patent Application Publication No. 2003-60578 (hereinafter referred to as Document 1) discloses a technology in which an correcting amount of frequency is calculated from a beat signal generated because of multiplexing of output lights from lasers of which channel is next to each other, as an adjusting method of a frequency interval (wavelength interval).

SUMMARY

According to an aspect of the present invention, there is provided an optical transmission system including a plurality of transmitters that output an optical signal having a frequency different from each other; a process unit that adds a reference signal to at least two of the optical signals, the reference signal having a frequency width narrower than that of the two optical signals, an interval of central frequencies of the reference signals being narrower than that of the two optical signals, a multiplexer that multiplexes optical signals output by the plurality of transmitters; an extract unit that extracts a beat signal generated between the reference signals because of a multiplexing of the multiplexer; and an adjust unit that adjusts a frequency interval of the two optical signals in accordance with an extract result of the extract unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3A to FIG. 3D illustrate a simulation result;

FIG. 7 illustrates a beat signal in a case where a number of channels is three or more;

FIG. 13A to FIG. 13D illustrates a simulation result;

DESCRIPTION OF EMBODIMENTS

In the technology of Document 1, a light receiver of which band width is wider than a band width between adjacent channels is needed. A number of the light receiver increases according to a number of channels.

The following is a description of embodiments, with reference to the accompanying drawings.

First Embodiment

Figure 1A:
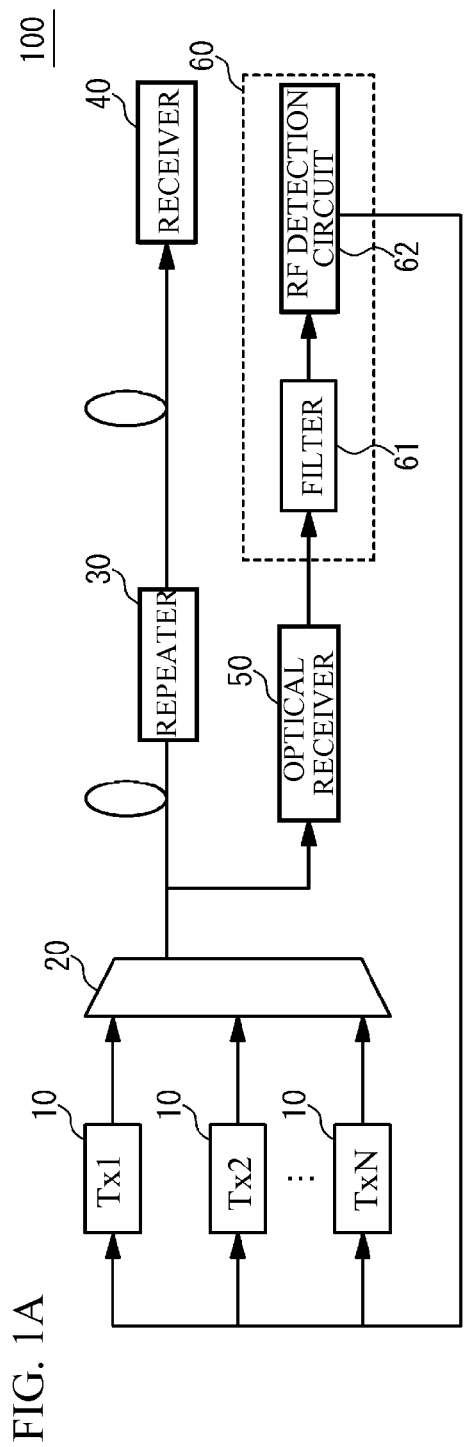
FIG. 1A illustrates a block diagram of a main structure of an optical transmission system in accordance with a first embodiment.
Figure 1B:
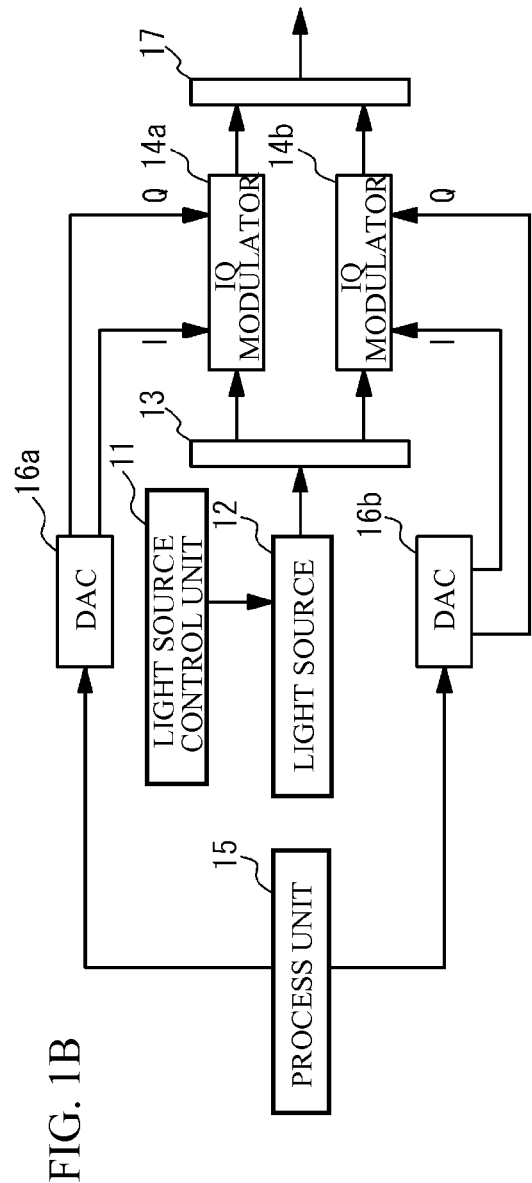
FIG. 1B illustrates a detailed block diagram of a transmitter.

FIG. 1A illustrates a block diagram of a main structure of an optical transmission system 100 in accordance with a first embodiment. FIG. 1B illustrates a detailed block diagram of a transmitter described later. As an example, the optical transmission system 100 is a transmission system of a WDM (Wavelength Division Multiplexing) type. The optical transmission system 100 multiplexes optical signals of N channels and transmits the multiplexed signal. Each optical signal of the N channels has a different frequency. The channels 1 to N are set in descending order or ascending order according to frequency. Therefore, the frequency is next to each other with respect to channels next to each other. In the embodiment, as an example, the channels 1 to N are set in ascending order according to frequency.

As illustrated in FIG. 1A, the optical transmission system 100 has N transmitters 10 (Tx1 to TxN), a multiplexer 20, a repeating device 30, a receiver 40, an optical receiver 50, a frequency interval extract unit 60 and so on. The frequency interval extract unit 60 has a filter 61 and an RF detection circuit 62. The N transmitters 10 and the multiplexer 20 act as an optical transmission device. As illustrated in FIG. 1B, the transmitter 10 has a light source control unit 11, a light source 12, a branch unit 13, an IQ modulators 14a and 14b, a process unit 15, a digital/analog converters (DAC) 16a and 16b and a multiplexer 17.

The light source control unit 11 controls an output optical intensity and an output frequency (output wavelength) of the light source 12. The light source 12 is a device for outputting an optical signal having a frequency peak at a specific wavelength, such as a semiconductor laser. The light source 12 receives an instruction from the light source control unit 11, and output an optical signal having a frequency according to a channel. The branch unit 13 is a branch unit for branching an optical signal from the light source 12 into two waves. For example, the branch unit 13 is a 3 dB coupler or a PBS (Polarization Beam Splitter).

One wave from the branch unit 13 is input into the IQ modulator 14a. The other wave from the branch unit 13 is input into the IQ modulator 14b. The DAC 16a converts a drive signal of the process unit 15 into analog signals of an I (In-Phase) component and a Q (Quadrature) component, and input the analog signals into the IQ modulator 14a. The DAC 16b converts the drive signal of the process unit 15 into analog signals of an I component and a Q component, and inputs the analog signals into the IQ modulator 14b.

The IQ modulator 14a is a modulator performing an optical modulation in accordance with the analog signals from the DAC 16a, and outputs a first modulation signal. The IQ modulator 14b is a modulator performing an optical modulation in accordance with the analog signals from the DAC 16b and outputs a second modulation signal. The multiplexer 17 is a device for multiplexing two input waves with orthogonal right angle, and is a PBC (Polarization Beam Combiner) as an example. The multiplexer 17 multiplexes the first modulation signal and the second modulation signal, and outputs the multiplexed signal as an optical signal of each channel.

An optical signal output by each transmitter 10 is multiplexed by the multiplexer 20, and received by the receiver 40 via the repeating device 30. With the processes, an optical signal output by each transmitter 10 is transmitted. A part of the optical signal output by the multiplexer 20 is received by the optical receiver 50. The optical receiver 50 has a light-receiving element such as a photodiode, converts a received optical signal into an electrical signal by a photoelectric conversion, and outputs the electrical signal to the frequency interval extract unit 60. The frequency interval extract unit 60 extracts a frequency interval (wavelength interval) of an optical signal output by each transmitter 10 in accordance with the electrical signal from the optical receiver 50, and transmits the extracted result to each transmitter as a feedback signal. The light source control unit 11 of each transmitter 10 adjusts the frequency interval (wavelength interval) of each channel in accordance with the feedback signal from the frequency interval extract unit 60. That is, the light source control unit 11 also acts as a adjust unit for adjusting the frequency interval.

Any one of the light source control unit 11 and the process unit 15 may adjust the frequency interval of each transmitter 10. In concrete, the light source control unit 11 may correct an output frequency of the light source 12. The process unit 15 may correct an output frequency by controlling a carrier frequency of an optical signal output by the IQ modulators 14a and 14b.

Next, a description will be given of details of extracting of a frequency interval by the frequency interval extract unit 60. The process unit 15 adds a pilot tone at a frequency that has a distance of a predetermined interval ($\Delta f_{pilot}$) from a central frequency of an optical signal output by the transmitter 10 thereof to a frequency side of an adjacent channel, as a reference signal. The pilot tone is a single frequency light and is non-modulated continuous light. When an adjacent channel is provided on both the low frequency side and the high frequency side, the process unit 15 adds a pilot tone at a frequency that has a distance of plus-minus $\Delta f_{pilot}$ from the central frequency of the optical signal output by the transmitter 10 thereof. The central frequency may be a frequency at a peak intensity of an optical signal, a central frequency of a frequency width of an optical signal, or the like.

Figure 2A:
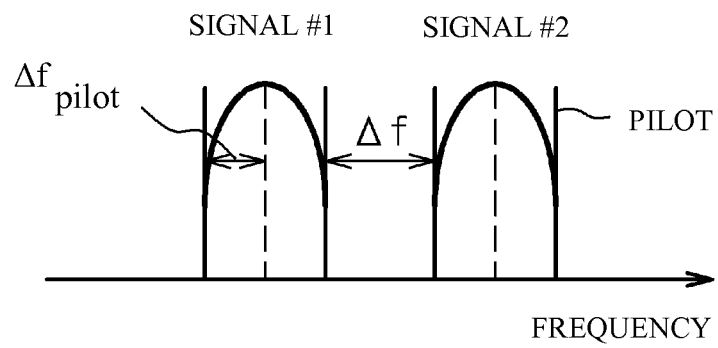
FIG. 2A illustrates an example of an optical spectrum of a signal to which a pilot tone is added.

FIG. 2A illustrates an example of an optical spectrum to which a pilot tone is added. When pilot tones of channels next to each other are overlapped, a beat signal having a frequency of a frequency difference ($\Delta f$) between the pilot tones is generated. In the example of FIG. 2A, $\Delta f$ is a difference between a frequency of a pilot tone of high frequency side of a signal #1 and a frequency of a pilot tone of low frequency side of a signal #2. The beat signal appears as a frequency difference component between pilot tones in an electrical signal output by the optical receiver 50.

Figure 2B:
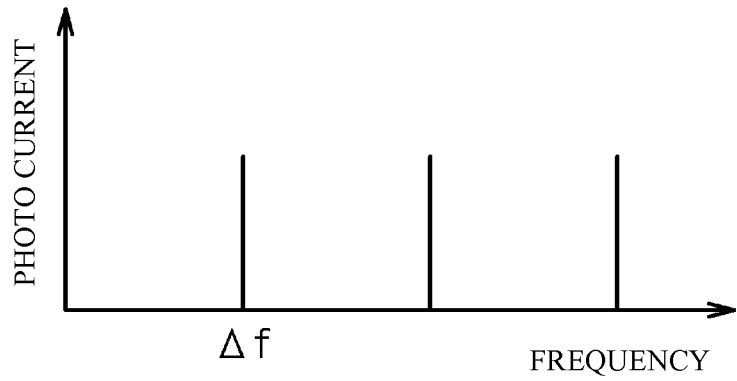
FIG. 2B illustrates an example of a frequency difference component included in an electrical signal output by a transmitter.

FIG. 2B illustrates a frequency difference component included in the electrical signal output by the optical receiver 50. The frequency difference component is transmitted to the transmitter 10 as a feedback signal having information of a frequency interval between channels. Thus, an output wavelength of each transmitter 10 is corrected. A spectrum other than $\Delta f$ in FIG. 2B is another frequency difference component such as a frequency difference component between a pilot tone of a low frequency side of the signal #1 and a pilot tone of a high frequency side of the signal #2.

A description will be given of a principle of generation of a beat signal. Two electrical fields of two light waves are expressed as the following formulas (1) and (2). In the following formulas (1) and (2), "t" indicates a time, "$E_i$" indicates amplitude of an electrical field, "$\omega_i$" indicates an angular frequency, and "$\theta_i$" indicates a phase (i=1, 2).

$$E_1(t)=E_1X\cos(\omega_1 t+\theta_1) \quad (1)$$

$$E_2(t)=E_2X\cos(\omega_2 t+\theta_2) \quad (2)$$

A power obtained when the two light waves are overlapped is expressed as "P". In this case, the following formula (3) is obtained. <> indicates a time average. In accordance with the following formula (3), the power P has a frequency difference component (a beat component) of two frequencies.

$$P=<|E_1(t)+E_2(t)|^2>=<E_1(t)^2+2E_1(t)E_2(t)+E_2(t)^2>= \\ (E_1^2+E_2^2)/2+2E_1E_2\cos\{(\omega_1-\omega_2)t+(\theta_1-\theta_2)\} \quad (3)$$

An output photo current of an optical receiver such as a photo detector is proportional to an input optical intensity. A photo current $I_{PD}$ output by the optical receiver in a case where two lights having a different frequency are received by the optical receiver is expressed as the following formula (4). "$\eta$" indicates a light-receiving sensitivity of the optical receiver and a proportional constant between the input optical power and the optical current.

$$I_{PD}=\eta P \quad (4)$$

FIG. 3A to FIG. 3D illustrate a simulation result. FIG. 3A illustrates a device structure used in the simulation. As illustrated in FIG. 3A, a transmitter Tx1, a transmitter Tx2, a multiplexer 200 and an optical receiver 300 are used. An output frequency of the transmitter Tx1 is lower than that of the transmitter Tx2. An interval of the output frequencies is 50 GHz. Optical signals output by the transmitter Tx1 and the transmitter Tx2 are multiplexed by the multiplexer 200, and is received by the optical receiver 300.

FIG. 3B illustrates an optical spectrum of a signal in which pilot tones are added to an optical signal output by the transmitter Tx2. As illustrated in FIG. 3B, pilot tones are added to frequencies at plus-minus 20 GHz from a central frequency. FIG. 3C illustrates an optical spectrum of a signal output by the multiplexer 200. As illustrated in FIG. 3C, a frequency difference between a pilot tone of high frequency side of the transmitter Tx1 and a pilot tone of a low frequency side of the transmitter Tx2 is 10 GHz.

FIG. 3D illustrates an electrical signal output from the optical receiver 300. As illustrated in FIG. 3D, a spectrum appears as a frequency difference component at a position indicating a frequency difference between each pilot tone. For example, a spectrum appears at a frequency of 10 GHz. The spectrum is a frequency difference component between the pilot tone of high frequency side of the transmitter Tx1 and the pilot tone of low frequency side of the transmitter Tx2. When a frequency of the frequency difference component is adjusted, a frequency interval between the optical signal of the transmitter Tx1 and the optical signal of the transmitter Tx2 can be adjusted.

Figure 4:
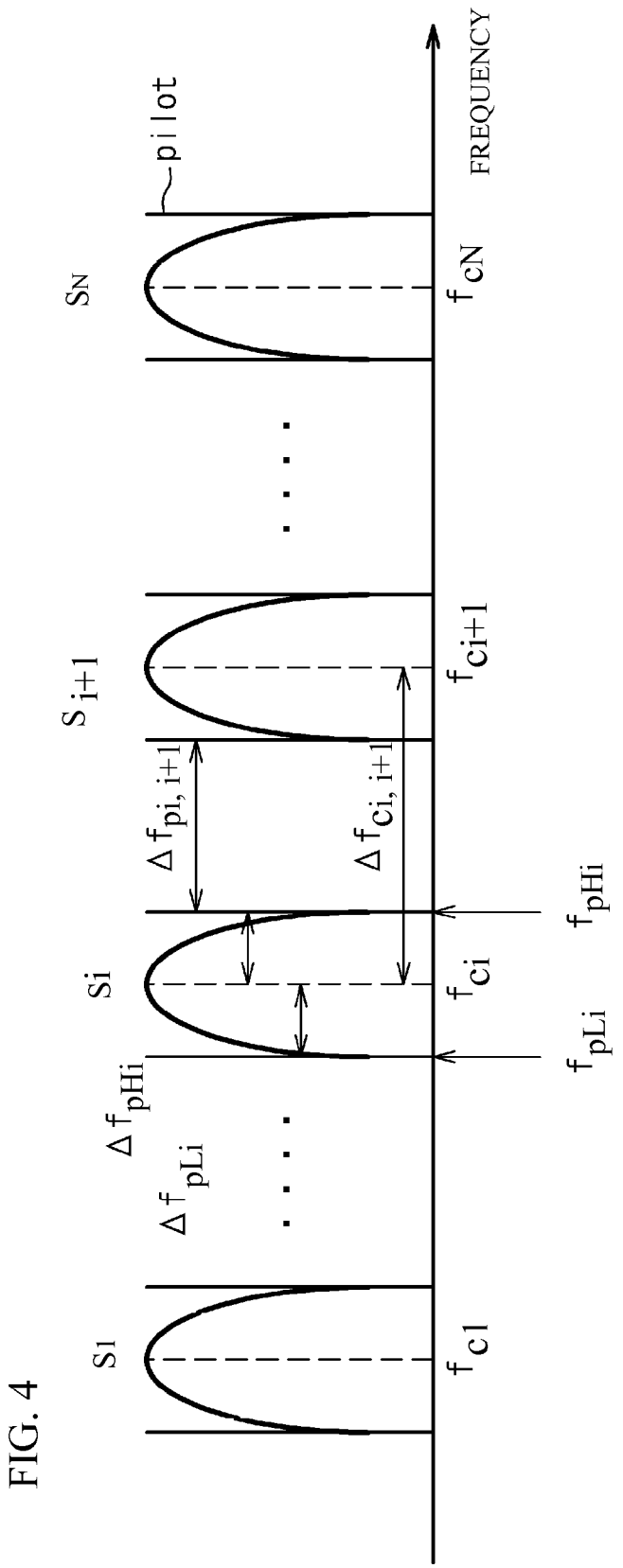
FIG. 4 illustrates optical signals of channel 1 to channel N.

Here, codes of pilot tones and optical signals of the N channels are defined. FIG. 4 illustrates optical signals of the channel 1 to the channel N. In FIG. 4, as an example, the channels 1 to N are set in order from low frequency side. An optical signal of each channel is expressed as S1, S2 to Sn. A central frequency of the optical signal $S_i$ is expressed as $f_{ci}$. Frequencies of pilot tones of high frequency side and low frequency side are expressed as $f_{pLi}$ and $f_{pHi}$. "i" indicates an integer satisfying a relation 1≤i≤N. Differences between the central frequency and the pilot tones are expressed as $\Delta f_{pLi}$ and $\Delta f_{pHi}$. In this case, relations of $\Delta f_{pLi}=f_{ci}-f_{pLi}$ and $\Delta f_{pHi}=-f_{ci}+f_{pHi}$ are obtained.

A difference between a central frequency of the optical signal $S_i$ and a central frequency of the optical signal $S_{i+1}$ is expressed as $\Delta f_{ci,\,i+1}$. A frequency difference between a pilot tone of high frequency side of the optical signal $S_i$ and a pilot tone of low frequency side of the optical signal $S_{i+1}$ is expressed as $\Delta f_{pi,\,i+1}$. In this case, a relation of $\Delta f_{ci,\,i+1}=\Delta f_{pi,\,i+1}\Delta f_{pi}+\Delta f_{pi+1}$ is obtained. That is, the difference $\Delta f_{ci,\,i+1}$ of the central frequencies is determined from $\Delta f_{pi,\,i+1}$ uniquely. Accordingly, it is possible to adjust an interval of central frequencies of channels next to each other, by adjusting a frequency difference between pilot tones of channels next to each other.

Figure 5:
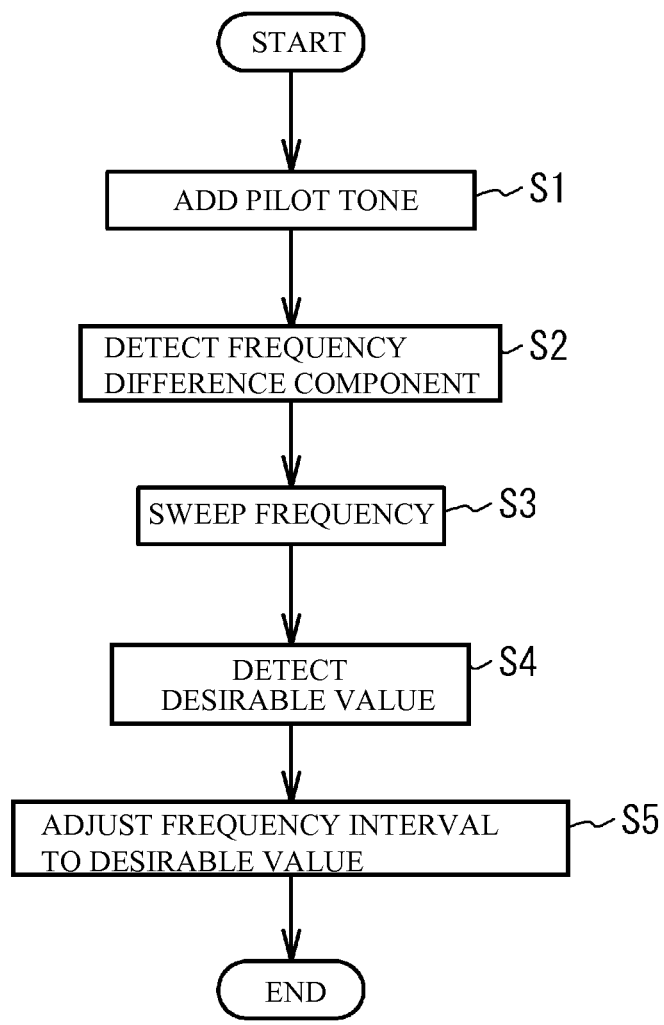
FIG. 5 illustrates a flow chart of an operation of the optical transmission system.
Figure 6:
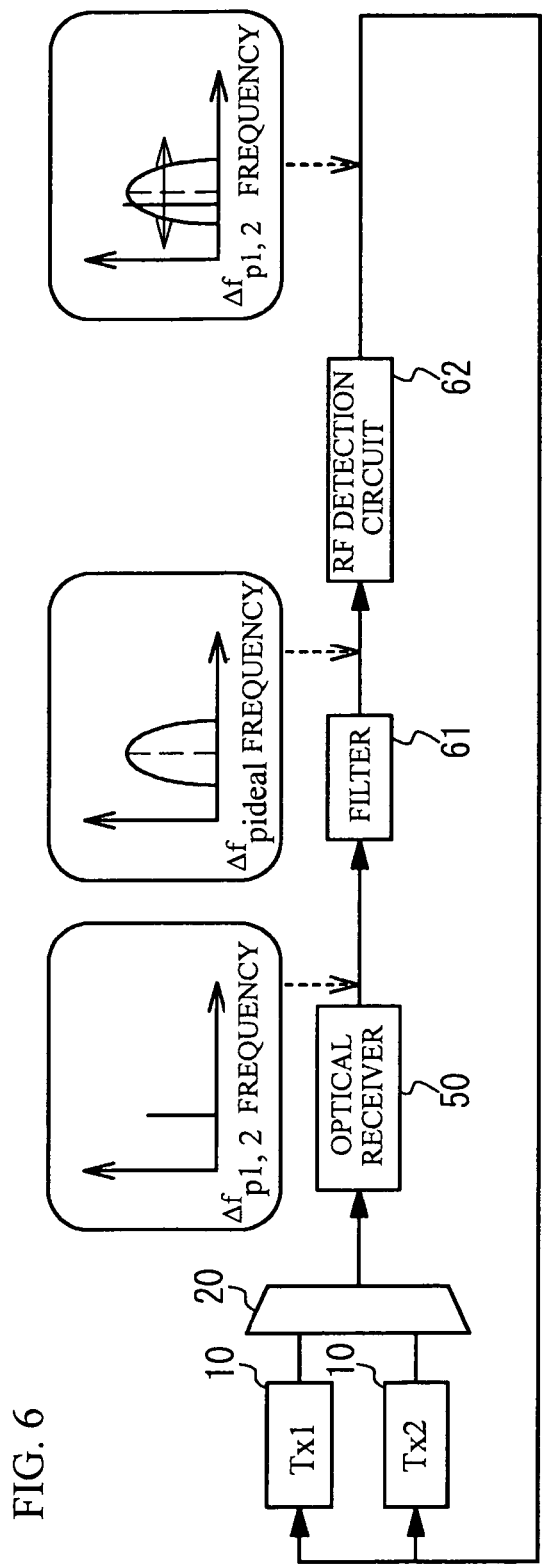
FIG. 6 illustrates a feedback to the transmitter.

A description will be given of details of adjustment of the frequency interval of each optical signal. First, a description will be given of a case where there are two channels. FIG. 5 illustrates a flow chart of an operation of the optical transmission system 100. FIG. 6 illustrates a feedback to the transmitter 10. As an example, a description will be given of a process for changing the output frequency of the transmitter Tx2 with use of the output frequency of the transmitter Tx1 as a reference.

The process unit 15 adds a pilot tone of FIG. 2A in the transmitter Tx1 and the transmitter Tx2 (Step S1). Thus, a frequency component appears in an electrical signal output by the optical receiver 50 at a frequency difference $\Delta f_{p1,\,2}$ between the pilot tone of high frequency side of the transmitter Tx1 and the pilot tone of low frequency side of the transmitter Tx2. The frequency difference $\Delta f_{p1,2}$ is a desirable value $\Delta f_{pideal}$.

A frequency difference component of the frequency difference $\Delta f_{p1,\,2}$ passes through the filter 61 and is detected by the RF detection circuit 62 (Step S2). The filter 61 is a band pass filter of which central frequency is $\Delta f_{pideal}$. The filter 61 has a transparent band of which transmissivity decreases as a shift amount from the central frequency increases. When $\Delta f_{pideal}$ is zero, a low pass filter or a high pass filter may be used as the filter 61 instead of the band pass filter. And a DC detection circuit may be used instead of the RF detection circuit 62.

Next, the light source control unit 11 sweeps a frequency of an optical signal output by the transmitter Tx2 (Step S3). The process unit 15 detects a frequency difference $\Delta f_{p1,\,2}$ in a case where a power of a frequency difference component of a frequency difference $\Delta f_{p1,\,2}$ is maximum as a desirable value $\Delta f_{pideal}$ (Step S4). The process unit 15 adjusts the frequency difference $\Delta f_{p1,\,2}$ to the desirable value $\Delta f_{pideal}$ (Step S5). Through the processes, a frequency interval between the optical signal of the transmitter Tx1 and the optical signal of the transmitter Tx2 can be adjusted. When a notch filter is used instead of a band pass filter, the frequency difference $\Delta f_{p1,\,2}$ in a case where the power of the frequency difference component of the frequency difference $\Delta f_{p1,\,2}$ is a minimum is the desirable value $\Delta f_{pideal}$.

In accordance with the embodiment, a pilot tone is added on the high frequency side of the central frequency of the optical signal output by the transmitter Tx1 and on the low frequency side of the central frequency of the optical signal output by the transmitter Tx2. In this case, an interval between central frequencies of pilot tones is narrower than the interval between the central frequencies of the two optical signals. Thus, it is not necessary to use an optical receiver of which band width is wider than the band width between the two optical signals in the extracting of the beat signal. This allows reduction of cost. And the beat signal can be extracted from an optical signal output by the multiplexer 20. It is therefore not necessary to provide an optical receiver according to each channel. Accordingly, the cost can be reduced, and the device can be downsized.

In the embodiment, a pilot tone is added on the high frequency side of the central frequency of the optical signal output by the transmitter Tx1 and on the low frequency side of the central frequency of the optical signal output by the transmitter Tx2. However, the structure is not limited. For example, a pilot tone may be added to the central frequency of the optical signal output by the transmitter Tx1, and another pilot tone is added on the low frequency side of the central frequency of the optical signal output by the transmitter Tx2. In this case, an interval of central frequencies of the pilot tones is narrower than the interval of the central frequencies of the above-mentioned two optical signals. When a pilot tone is added on the low frequency side of the central frequency of the optical signal output by the transmitter Tx1, a pilot tone has only to be added on the low frequency side of the central frequency of the optical signal output by the transmitter Tx2 in a large way.

A description will be given of a setting value of a preferable frequency of a pilot tone. The optical signal $S_i$ and the optical signal $S_{i+1}$ are selected as an example. It is preferable that the following formula (5) is satisfied as a condition that two pilot tones occur.

$$\Delta f_{pilot}>0 \quad (5)$$

It is preferable that the following formula (6) is satisfied because it is preferable that a magnitude relation of the frequencies of the pilot tones is not reversed ($f_{pHi}<f_{pLi+1}$). A desirable frequency difference is expressed as $\Delta f_{ci,\,i+1,\,ideal}$ and an estimated maximum frequency fluctuation occurring in the light source 12 is expressed as $f_{fluctuation}$.

$$\Delta f_{pilot}<\Delta f_{ci,i+1,ideal}/2-f_{fluctuation} \quad (6)$$

It is preferable that the following formula (7) is satisfied in view of a band width $f_{bandwidth}$ of the transmitter 10. It is preferable that the following formula (8) is satisfied because a frequency of a beat signal is within the band width $f_{PDbandwidth}$ of the optical receiver 50.

$$\Delta f_{pilot}<f_{bandwidth} \quad (7)$$

$$\Delta f_{pi,i+1}<f_{PDbandwidth} \quad (8)$$

First Modified Embodiment

A description will be given of adjusting of frequency interval of each optical signal in a case where there are three or more channels. When the number of the channels is three or more, a plurality of beat signals having a frequency close to each other may occur. In concrete, as illustrated in FIG. 7, a frequency difference $\Delta f_{pi-1, i}$ between the pilot tone on the high frequency side of the optical signal $S_{i-1}$ and the pilot tone on the low frequency side of the optical signal $S_i$ is close to the frequency difference $\Delta f_{pi, i+1}$ between the pilot tone on the high frequency side of the optical signal $S_i$ and the pilot tone on the low frequency side of the optical signal $S_{i+1}$. In this case, a plurality of frequency difference components appear around the desirable value $\Delta f_{pideal}$ of the electrical signal output by the optical receiver 50. Thus, it is difficult to adjust the frequency interval.

Figure 8A:
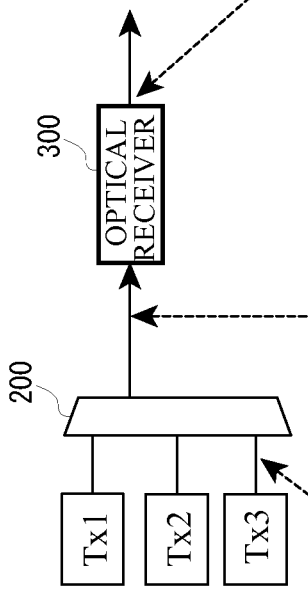
FIG. 8A to FIG. 8D illustrate a simulation result.

FIG. 8A to FIG. 9B illustrate a simulation result. FIG. 8A illustrates a device structure used for the simulation. As illustrated in FIG. 8A, the transmitter Tx1, the transmitter Tx2, the transmitter Tx3, the multiplexer 200 and the optical receiver 300 are used. An output frequency of the transmitters Tx1, Tx2 and Tx3 is set in ascending order. An interval between the output frequencies of transmitters next to each other is 50 GHz. Optical signals output by the transmitters Tx1 to Tx3 are multiplexed by the multiplexer 200, and are received by the optical receiver 300.

Figure 8D:
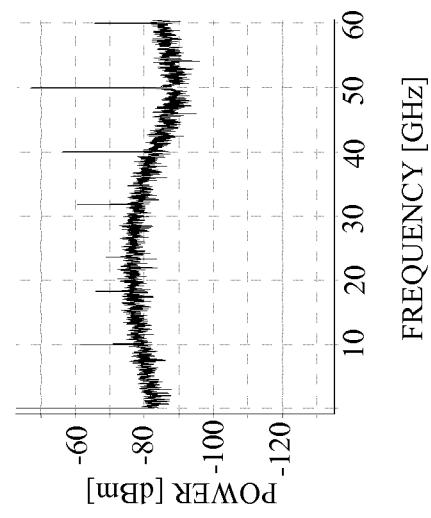
Figure 8C:
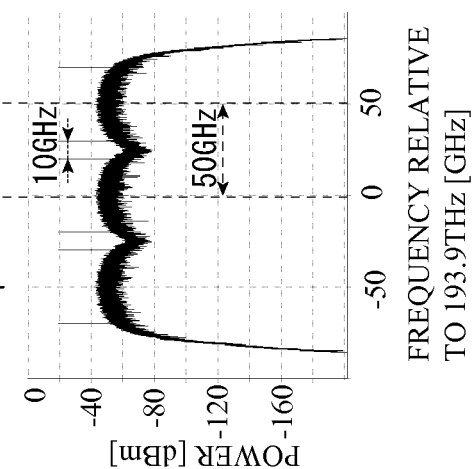
Figure 8B:
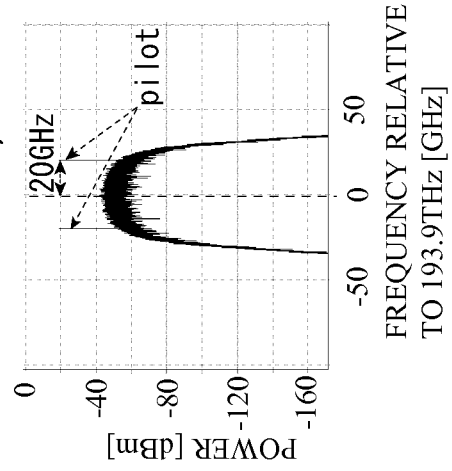

FIG. 8B illustrates an optical spectrum in which a pilot tone is added to the optical signal of the transmitter Tx3. As illustrated in FIG. 8B, pilot tones are added to frequencies that are plus-minus 20 GHz from the central frequency. FIG. 8C illustrates an optical spectrum of a signal output by the multiplexer 200. As illustrated in FIG. 8C, a frequency difference between the pilot tone on the low frequency side of the transmitter Tx1 and the pilot tone on the high frequency side of the transmitter Tx2 and a frequency difference between the pilot tone on the low frequency side of the transmitter Tx2 and a pilot tone on a high frequency side of the transmitter Tx3 are 10 GHz.

FIG. 8D illustrates an electrical signal output by the optical receiver 300. As illustrated in FIG. 8D, a spectrum appears at a position of a frequency difference between each pilot tone as a frequency difference component. For example, a spectrum appears at a frequency of 10 GHz. The spectrum is a frequency difference component between the pilot tone on the high frequency side of the transmitter Tx1 and the pilot tone on the low frequency side of the transmitter Tx2 and a frequency difference component between the pilot tone on the high frequency side of the transmitter Tx2 and the pilot tone on the low frequency side of the transmitter Tx3.

Figure 9A:
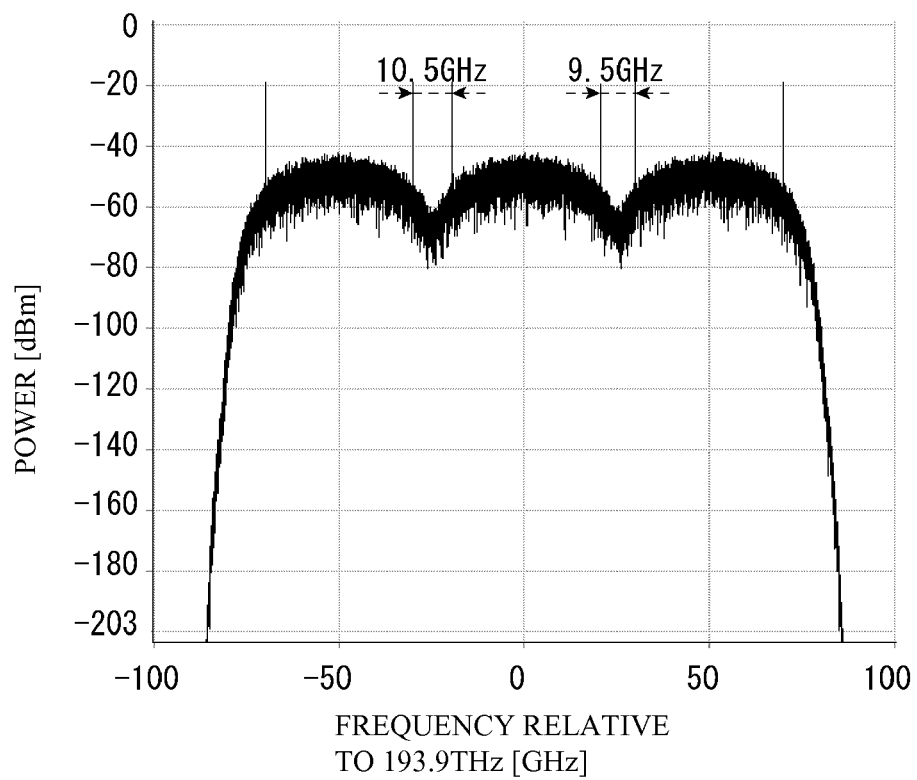
FIG. 9A and FIG. 9B illustrate a simulation result.
Figure 9B:
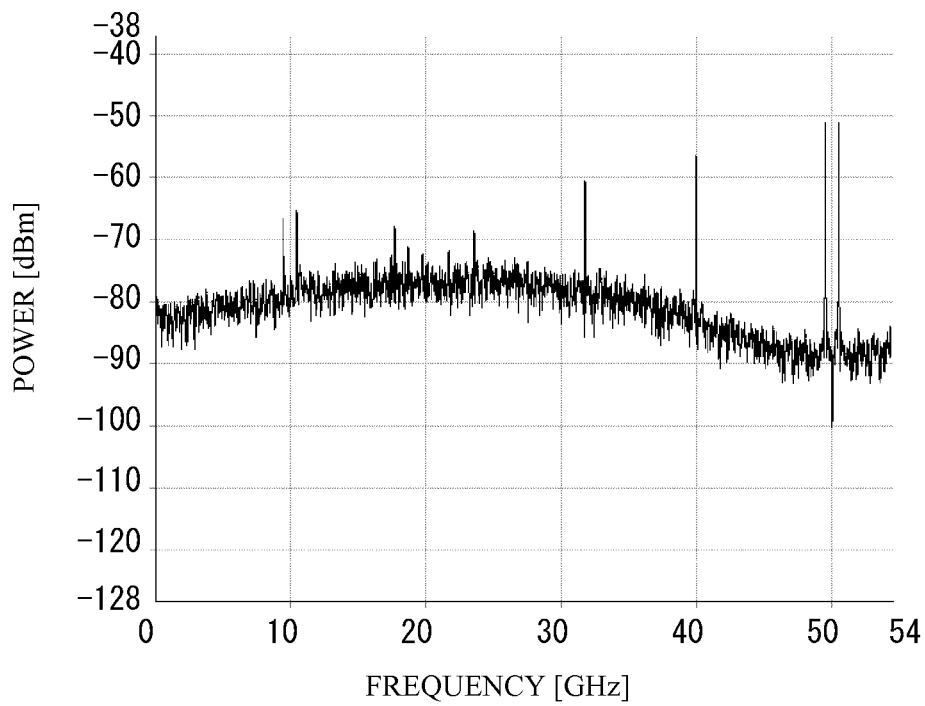

FIG. 9A illustrates a spectrum in a case where the central frequency of the output frequency of the transmitter Tx2 is shifted by +500 MHz. As illustrated in FIG. 9A, a frequency difference between the pilot tone on the high frequency side of the transmitter Tx1 and the pilot tone on the low frequency side of the transmitter Tx2 is 9.5 GHz. A frequency difference between the pilot tone on the high frequency side of the transmitter Tx2 and the pilot tone on the low frequency side of the transmitter Tx3 is 10.5 GHz. FIG. 9B illustrates an electrical signal output by the optical receiver 300 in this case. As illustrated in FIG. 9B, a plurality of spectrums appear around 10 GHz. This is because a frequency difference between the pilot tone on the high frequency side of the transmitter Tx1 and the pilot tone on the low frequency side of the transmitter Tx2 is close to a frequency difference between the pilot tone on the high frequency side of the transmitter Tx2 and the pilot tone on the low frequency side of the transmitter Tx3.

Figure 10:
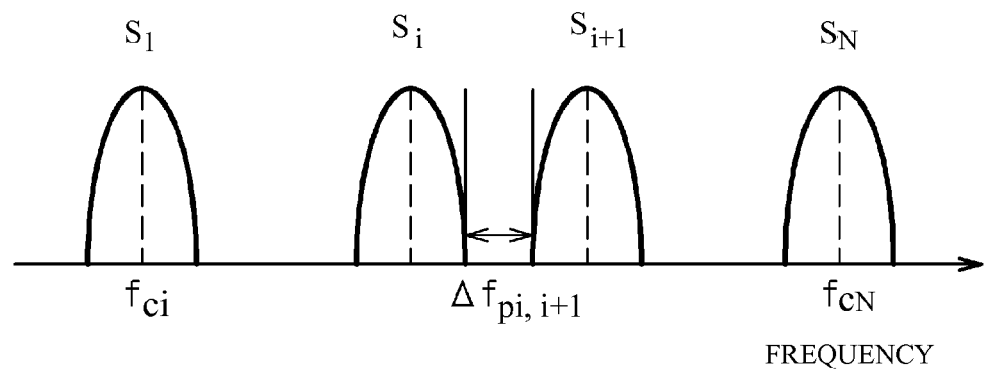
FIG. 10 illustrates a case where a pilot tone is added to only two channels next to each other.

In the first modified embodiment, as illustrated in FIG. 10, it is possible to adjust a frequency interval with the same process as FIG. 5 and FIG. 6 by adding pilot tones to only two channels next to each other that are an objective of the frequency interval adjustment. For example, pilot tones may be added to the optical signal $S_{i+1}$ and the optical signals $S_{i+2}$ and a frequency interval between the optical signal $S_{i+1}$ and the optical Signal $S_{i+2}$ may be adjusted after adding a pilot tone only on the high frequency side of the optical signal $S_i$ and the low frequency side of the optical signal $S_{i+1}$ and adjusting a frequency interval between the optical signal $S_i$ and the optical Signal $S_{i+1}$.

Figure 11:
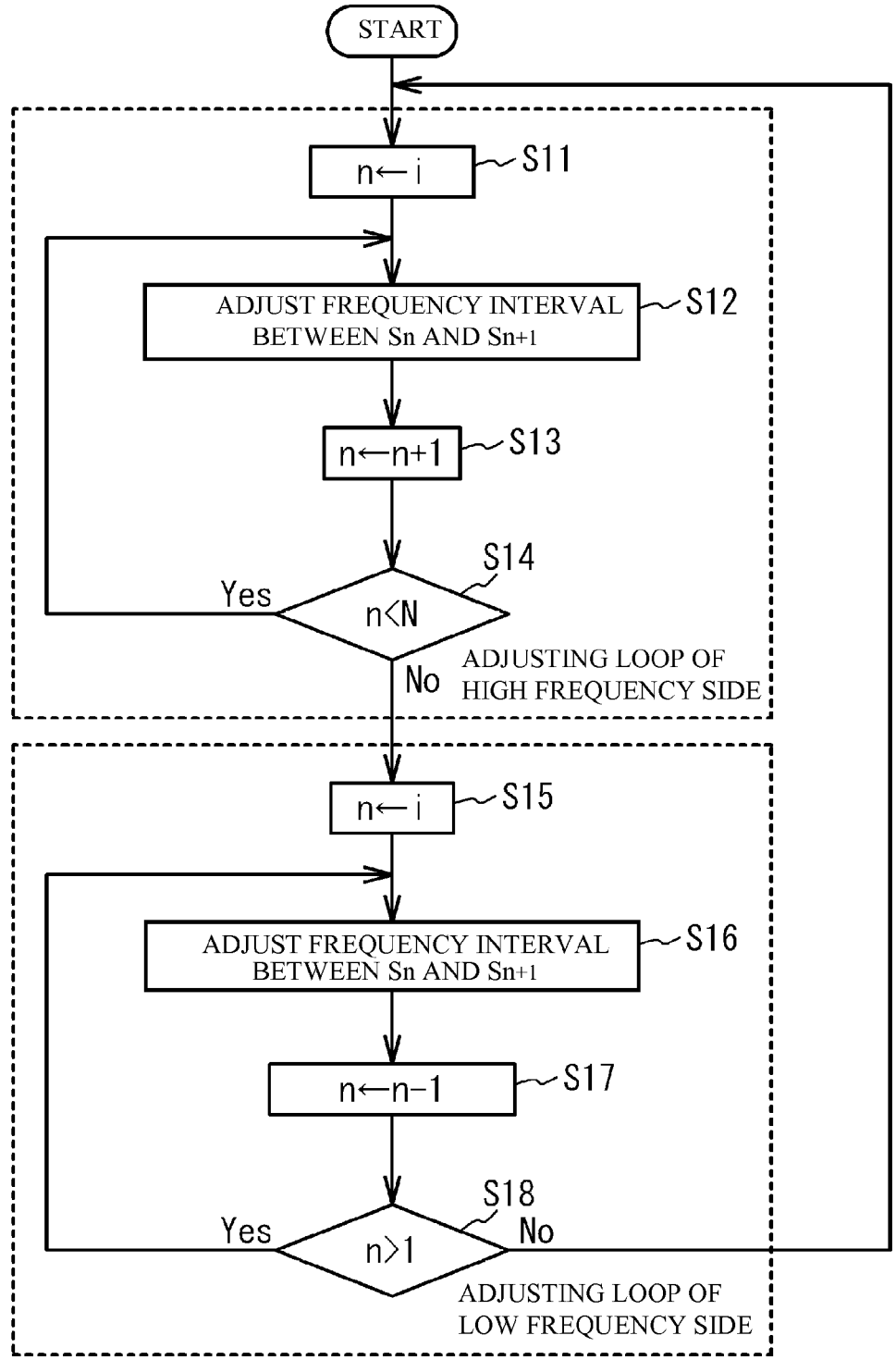
FIG. 11 illustrates an example of a flow chart.

FIG. 11 illustrates an example of a flowchart executed in this case. As illustrated in FIG. 11, the process unit 15 substitutes "i" into a variable "n" (Step S11). "i" is a channel number having high reliability with respect to an output frequency. Next, the process unit 15 adjusts a frequency interval between an optical signal $S_n$ and an optical signal $S_{n+1}$ (Step S12). The frequency interval is adjusted with the process of FIG. 5. In the Step S12, a frequency of the optical signal $S_n$ is fixed, and a frequency of the optical signal $S_{n+1}$ is swept.

Next, the process unit 15 adds "1" to the variable "n" (Step S13). Next, the process unit 15 determines whether the variable "n" is less than N (Step S14). If it is determined as "Yes" in the Step S14, the Step S12 is executed again. If it is determined as "No" in the Step S14, the process unit 15 substitutes "i" into the variable "n" (Step S15). Next, the process unit 15 adjusts a frequency interval between the optical signal $S_n$ and the optical signal $S_{n-1}$ (Step S16). The frequency interval is adjusted with the process of FIG. 5. In the Step S16, the frequency of the optical signal $S_n$ is fixed, and the frequency of the optical signal $S_{n-1}$ is swept.

Next, the process unit 15 decreases the variable "n" by one (Step S17). Next, the process unit 15 determines whether the variable "n" is larger than "1" (Step S18). If it is determined as "Yes" in the Step S18, the Step S16 is executed again. If it is determined as "No" in the Step S18, the Step S11 is executed again.

In the modified embodiment, the frequency intervals between the optical signal $S_i$ and the low frequency side channel and between the optical signal $S_i$ and the high frequency side channel are adjusted in order. However, the structure is not limited. For example, frequency intervals between the channel 1 and the high frequency side channels may be adjusted in order. Frequency intervals between the channel N and the low frequency side channels may be adjusted in order.

In the modified embodiment, an interval between central frequencies of pilot tones is narrower than an interval between central frequencies of two optical signals. It is therefore not necessary to use an optical receiver of which band width is wider than a band width of the above-mentioned two optical signals during extracting a beat signal. And, it is not necessary to provide an optical receiver according to each channel because the above-mentioned beat signal can be extracted from the optical signal output by the multiplexer 20.

An output frequency of a light source such as a semiconductor laser may fluctuate because of a temperature changing, an aging degradation or the like. However, an order of the frequency fluctuation is a second or more. The order may be an hour or a year. When a DSP (Digital Signal Processor) or the like is used for the frequency adjustment of each transmitter 10, synchronization is possible with a time constant of millisecond or less. The detection of a beat signal can be achieved in a video bandwidth of millisecond or less. Therefore, it is possible to follow the frequency fluctuation caused by the temperature changing or the aging degradation when each frequency interval is adjusted in accordance with the flow chart of FIG. 11.

Second Modified Embodiment

In the first modified embodiment, pilot tones are added to only two adjacent channels that are objectives of the frequency interval adjustment. However, a pilot tone may be added to an optical signal of another channel. In this case, when a frequency interval between an objective channel and a low frequency side channel next to the objective channel is adjusted, frequencies of other lower frequency side channels are swept together. When a frequency interval between the objective channel and a high frequency side channel next to the objective channel is adjusted, frequencies of other higher frequency side channels are swept together. In concrete, when a frequency interval between the optical signal $S_i$ and the optical $S_{i+1}$ is adjusted, frequencies of the optical signals $S_k$ (k=i+2, i+3 to N) are swept in synchronization with a sweeping of the optical signal $S_{i+1}$. When a frequency interval between the optical signal $S_i$ and the optical $S_{i-1}$ is adjusted, frequencies of the optical signals $S_m$ (m=1, 2 to i-1) are swept in synchronization with a sweeping of the optical signal $S_{i-1}$. In this case, only a power of a frequency difference component between the reference channel and an adjacent channel changes. It is therefore possible to adjust the frequency difference between the reference channel and the adjacent channel to the desirable value $\Delta f_{pideal}$.

For example, the frequencies of the optical signals $S_k$ (k=n+2, n+3 to N) have only to be swept in synchronization with the sweeping of the frequency of the optical signal $S_{n+1}$ in the Step S12 of the flow chart of FIG. 11. The frequencies of the optical signals $S_m$ (m=1, 2, to n-1) have only to be swept in synchronization with the sweeping of the frequency of the optical signal $S_{n-1}$ in the Step S16 of the flow chart of FIG. 11.

Second Embodiment

Figure 12:
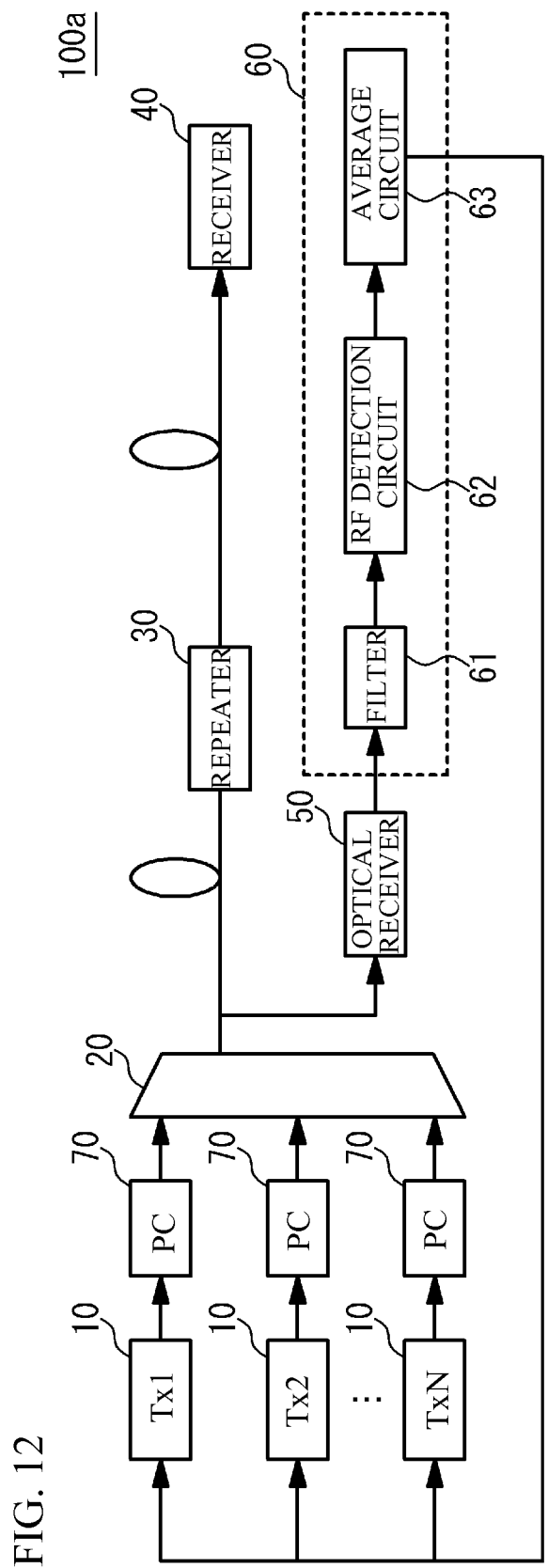
FIG. 12 illustrates a block diagram of a main structure of an optical transmission system in accordance with a second embodiment.

When polarization waves are at a right angle between pilot tones, a beat signal does not generated. And so, in a second modified embodiment, a beat signal is generated by periodically changing a polarization wave by a signal processing. FIG. 12 illustrates a block diagram of a main structure of an optical transmission system 100a in accordance with a second embodiment. The optical transmission system 100a is different from the optical transmission system 100 of FIG. 1 in points that a polarization wave control unit 70 is provided between each transmitter 10 and the multiplexer 20, and an average circuit 63 is provided in the frequency interval extract unit 60. The polarization wave control unit 70 adds a polarization rotation to an optical signal output by the transmitter 10. When a polarization wave of one of optical signals of two channels that are objectives of the frequency interval adjustment is periodically changed with an angular frequency w, a beat signal is generated. The average circuit 63 averages an output of the RF detection circuit 62. An average time constant $\tau$ satisfies $\tau > 2\pi/\omega$. When a synchronized detection is performed with the angular frequency $\omega$ with use of a synchronization detection circuit instead of the average circuit, a beat signal can be generated.

It is thought that a polarization wave of one of optical signals of two channels that are objectives of the frequency interval adjustment is periodically changed with the angular frequency $\omega$. Next, polarization waves of a plurality of channels may be changed with a different angular frequency. When an angular frequency of a polarization wave rotation added to the optical signal $S_n$ that is the n-th channel is "$\omega_n$", an RF power of a beat signal generated between the adjacent optical signals $S_i$ and $S_{i+1}$ has a component of $|\omega_i - \omega_{i+1}|$. In this case, the synchronization detection circuit is synchronized with an angular frequency of $|\omega_i - \omega_{i+1}|$, and thereby is capable of detecting the RF power of the beat signal between the optical signals $S_i$ and $S_{i+1}$. Here, the angular frequency $\omega_n$ of the polarization rotation added to each signal is set so that a difference $|\omega_i - \omega_{i+1}|$ between polarization rotation speed of adjacent channels is independent with respect all number of "n", the RF power of the beat signal generated between each optical signal has an independent frequency component. Therefore, when a synchronization frequency of the synchronization detection circuit is changed, a switching of a channel for the frequency interval adjustment in a case where there are a plurality of channels is possible. Further, in this case, the synchronized frequency sweeping of the second modified embodiment is not needed.

FIG. 13A to FIG. 13D illustrate a simulation result. A device structure used for the simulation is the same as FIG. 3A. FIG. 13A illustrates an optical spectrum of a signal output by the multiplexer 200. As illustrated in FIG. 13A, the frequency difference between the pilot tone on the high frequency side of the transmitter Tx1 and the pilot tone on the low frequency side of the transmitter Tx2 is 10 GHz.

FIG. 13B illustrates an electrical signal output by the optical receiver 300 in a case where an angle between a polarization wave of the pilot tone of the output light of the transmitter Tx1 and a polarization wave of the pilot tone of the output light of the transmitter Tx2 is zero. As illustrated in FIG. 13B, a spectrum appears at 10 GHz. FIG. 13C illustrates an electrical signal output by the optical receiver 300 in a case where an angle between the polarization wave of the pilot tone of the output light of the transmitter Tx1 and the polarization wave of the pilot tone of the output light of the transmitter Tx2 is 45 degrees. As illustrated in FIG. 13C, a spectrum appears at 10 GHz. FIG. 13D illustrates an electrical signal output by the optical receiver 300 in a case where an angle between the polarization wave of the pilot tone of the output light of the transmitter Tx1 and the polarization wave of the pilot tone of the output light of the transmitter Tx2 is 90 degrees (right angle). As illustrated in FIG. 13D, no beat signal appears. It is possible to generate a beat signal by changing a rotation angle of the polarization wave periodically.

Instead of changing and controlling the polarization wave continuously, the polarization wave may be rotated in advance, the polarization wave may be fixed to an angle at which an output of the RF detection circuit 62 is maximum, and the filter sweeping may be performed. Instead of the average circuit 63, a band pass filter of which central frequency is $2\pi\omega$ may be used in order to extract a component according to a frequency $2\pi\omega$ of the polarization wave rotation.

Figure 14:
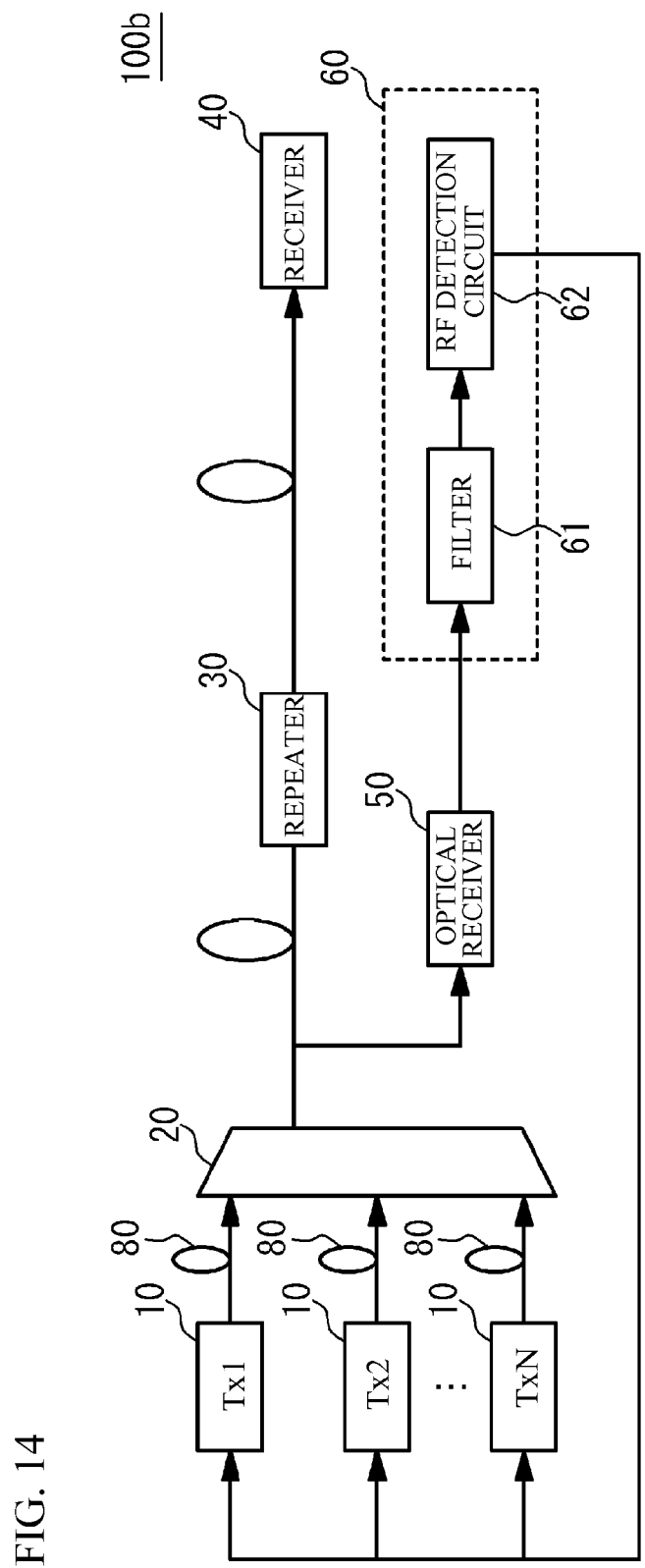
FIG. 14 illustrates a block diagram of a main structure of another optical transmission system.

The process unit 15 may rotate the polarization wave, instead of the polarization wave control unit 70. A polarization maintaining fiber may be used instead of the polarization wave control unit 70. In concrete, at least a part from the multiplexer 17 of each transmitter 10 to the multiplexer 20 may be connected by the polarization maintaining fiber. FIG. 14 illustrates a block diagram of a main structure of an optical transmission system 100b in this case. The optical transmission system 100b is different from the optical transmission system 100 in a point that a polarization maintaining fiber 80 connects between each transmitter 10 and the multiplexer 20. Each polarization maintaining fiber 80 is set so that polarization waves are not at a right angle between pilot tones.

In the above-mentioned embodiments, a pilot tone is added as the reference signal. However, the structure is not limited. A signal having a frequency width that is narrower than that of an optical signal of each channel may be added to optical signals of which frequency is next to each other with an interval that is narrower than an interval of central frequencies of the optical signals as the reference signal.

Figure 15:
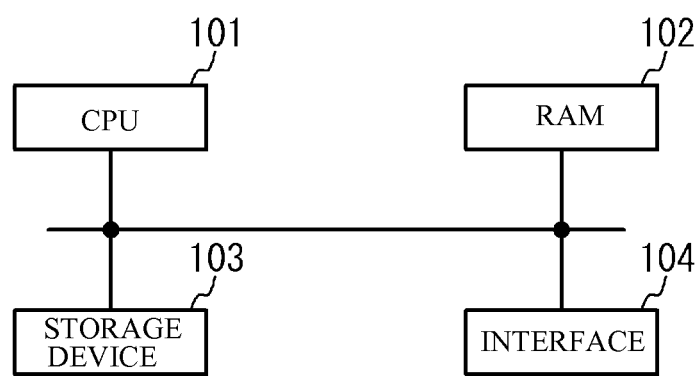
FIG. 15 illustrates a block diagram for describing a hard ware structure.

The light source control unit 11 and the process unit 15 may be a dedicated circuit or the like. However, the light source control unit 11 and the process unit 15 may be realized by a process device executing a program. FIG. 15 illustrates a block diagram of a hardware structure of a case where the light source control unit 11 and the process unit 15 are realized by executing a program. As illustrated in FIG. 15, the process unit 15 has a CPU 101, a RAM 102, a storage device 103, an interface 104 and so on. These components are connected via a bus or the like. The CPU 101 is a Central Processing Unit. The CPU 101 includes one or more core. The RAM (Random Access Memory) 102 is a volatile memory for temporarily storing a program executed by the CPU 101, a data processed by the CPU 101 and so on. The storage device 103 is a non-volatile storage device. A ROM (Read Only Memory), a solid state drive (SSD) such as a flash memory, a hard disk driven by a hard disk drive or the like can be used as the storage device 103. When the CPU 101 executes a predetermined program, the light source control unit 11 and the process unit 15 are realized in the optical transmission system 100.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical transmission system comprising:
a plurality of transmitters, each of which outputs an optical signal having a frequency different from each other;
a process unit that adds a reference signal to at least two optical signals of the plurality of transmitters, the reference signals having a frequency width narrower than that of the at least two of optical signals, an interval of central frequencies of the reference signals being narrower than that of the at least two of optical signals,
a multiplexer that multiplexes the at least two of optical signals output by the plurality of transmitters;
an extract unit that extracts a beat signal generated between the reference signals because of a multiplexing of the multiplexer; and
an adjust unit that adjusts an interval of central frequencies of the at least two of optical signals in accordance with the beat signal extracted by the extract unit.

2. The optical transmission system as claimed in claim 1, wherein the adjust unit obtains a predetermined frequency interval of the at least two of optical signals by sweeping a frequency relatively to another frequency of the at least two of optical signals, and adjusts the frequency interval of the at least two of optical signals to the predetermined frequency interval.

3. The optical transmission system as claimed in claim 1, wherein:
a number of the transmitters is three or more; and
the process unit does not add the reference signal to an optical signal other than two optical signals that are objectives of a frequency interval adjustment of the adjust unit.

4. The optical transmission system as claimed in claim 2, wherein:
a number of the transmitters is three or more;
the process unit adds the reference signal to an optical signal other than the at least two of optical signals that are objectives of a frequency interval adjustment of the adjust unit; and
the adjust unit sweeps a frequency with respect to the optical signal other than the at least two of optical signals in synchronization with the another frequency in the sweeping.

5. The optical transmission system as claimed in claim 1 further comprising a polarization wave control unit that changes a polarization angle between the reference signals periodically.

6. The optical transmission system as claimed in claim 1, wherein:
a number of the transmitters is three or more;
the process unit adds the reference signal to two optical signals of which frequency is next to each other;
the optical transmission system has a polarization wave control unit that adds a polarization rotation so that each frequency difference between polarization rotations of the reference signals added to the two optical signals is different from each other; and
the extract unit extracts a beat signal generated between the reference signals of the frequency difference in synchronization with any of frequency differences.

7. The optical transmission system as claimed in claim 1, wherein:
the transmitters that output the at least two of optical signals are coupled to the multiplexer by a polarization maintaining fiber; and
the polarization maintaining fiber maintains a polarization angle between the reference signals to an angle other than 90 degrees.

8. The optical transmission system as claimed in claim 1, wherein the reference signal is a pilot tone.

9. A method of adjusting an optical transmission device having a plurality of transmitters, each of which outputs an optical signal having a frequency different from each other and a multiplexer that multiplexes optical signals output by the plurality of transmitters, comprising:
adding a reference signal to at least two of the optical signals, the reference signals having a frequency width narrower than that of the at least two of optical signals, an interval of central frequencies of the reference signals being narrower than that of the at least two of optical signals;
extracting a beat signal generated between the reference signals because of a multiplexing of the multiplexer; and
adjusting an interval of central frequencies of the at least two of optical signals in accordance with the beat signal extracted in the extracting.

10. A non-transitory computer-readable medium storing a program that causes a computer to execute a process in an optical transmission device having a plurality of transmitters, each of which outputs an optical signal having a frequency different from each other and a multiplexer that multiplexes optical signals output by the plurality of transmitters, the process comprising:
adding a reference signal to at least two of the optical signals, the reference signals having a frequency width narrower than that of the at least two of optical signals, an interval of central frequencies of the reference signals being narrower than that of the at least two of optical signals;
extracting a beat signal generated between the reference signals because of a multiplexing of the multiplexer; and adjusting an interval of central frequencies of the at least two of optical signals in accordance with the beat signal extracted in the extracting.

\* \* \* \* \*